United States Patent
Donnels et al.

(10) Patent No.: US 11,989,685 B2
(45) Date of Patent: May 21, 2024

(54) INTELLIGENT COMPUTER FUNCTIONALITY AND VISUALIZATION FOR INVENTORY ITEM PLACEMENT

(71) Applicant: eBay Inc., San Jose, CA (US)

(72) Inventors: Magdalena Donnels, San Jose, CA (US); Rajesh Nanoo, Bellevue, WA (US); Raphael Philip Tsing Tseuk Tsow, San Jose, CA (US)

(73) Assignee: eBay Inc., San Jose, CA (US)

( * ) Notice: Subject to any disclaimer, the term of this patent is extended or adjusted under 35 U.S.C. 154(b) by 31 days.

(21) Appl. No.: 17/224,482

(22) Filed: Apr. 7, 2021

(65) Prior Publication Data

US 2022/0327468 A1    Oct. 13, 2022

(51) Int. Cl.
*G06Q 10/08* (2023.01)
*G06N 20/00* (2019.01)
*G06Q 10/087* (2023.01)

(52) U.S. Cl.
CPC .......... *G06Q 10/087* (2013.01); *G06N 20/00* (2019.01)

(58) Field of Classification Search
CPC ............................. G06Q 10/087; G06N 20/00
See application file for complete search history.

(56) References Cited

U.S. PATENT DOCUMENTS

| | | | |
|---|---|---|---|
| 8,620,707 B1 | 12/2013 | Belyi et al. | |
| 10,504,061 B1 * | 12/2019 | Shi | G06Q 10/0838 |
| 11,157,930 B1 * | 10/2021 | Bachu | G06Q 30/0201 |
| 2008/0301009 A1 * | 12/2008 | Plaster | G06Q 10/087 |
| | | | 705/28 |
| 2011/0004509 A1 | 1/2011 | Wu et al. | |

(Continued)

FOREIGN PATENT DOCUMENTS

WO    2018/118178 A1    6/2018

OTHER PUBLICATIONS

"Bubble Map." Charts—Data Visualization and Human Rights, http://visualizingrights.org/kit/charts/bubble-map.html. date accessed using the wayback machine https://web.archive.org/web/20180228040030/http://visualizingrights.org/kit/charts/bubble-map.html (Year: 2018).*

(Continued)

*Primary Examiner* — Peter Ludwig
*Assistant Examiner* — Reva R Moore
(74) *Attorney, Agent, or Firm* — Shook, Hardy & Bacon L.L.P.

(57) ABSTRACT

Various embodiments improve existing technologies by generating one or more user interface elements based at least in part on consumer demand of an item in various geographical regions. Such consumer demand can be computed in response to receiving an indication that a user needs to place an item in an inventory center. Some embodiments can use one or more machine learning models or other statistical models to predict consumer demand to select the particular inventory center. Some embodiments can additionally or alternatively rank each inventory center or recommend an inventory center based on the consumer demand and/or other factors, such as cost. All of this functionality not only improves upon the functionality of existing technologies, but improves the user experience and computing resource consumption relative to other technologies.

20 Claims, 9 Drawing Sheets

(56) References Cited

U.S. PATENT DOCUMENTS

2019/0303856 A1 10/2019 Mccardel et al.
2022/0036305 A1* 2/2022 Glick ................ G06Q 10/0875
2022/0083954 A1* 3/2022 Starostenko ......... G06Q 10/087

OTHER PUBLICATIONS

"BubbleMap." Charts—DataVisualizationandHumanRights,htto://visualizingrights.org/kit/charts/oubble-map.html.dateaccessed usingthewaybackmachinehttps:/Aweb.archive.org/web/20180228040030/http://visualizingrights.org/kit/charts/oubble-map.html (Year: 2018).*
Extended European Search Report received for European Patent Application No. 22164888.4 dated Jun. 9, 2022, 8 Pages.

* cited by examiner

| BRAND A COLOR B SNEAKERS | GEOGRAPHIC REGION | VIEW FREQUENCY | PURCHASE FREQUENCY | SKIP FREQUENCY | WATCH FREQUENCY | BID FREQUENCY |
|---|---|---|---|---|---|---|
| - | A | 120 | 43 | 2 | 14 | 80 |
| - | B | 30 | 10 | 20 | 7 | 22 |
| - | C | 82 | 14 | 10 | 4 | 43 |
| - | D | 64 | 10 | 13 | 3 | 16 |

*FIG. 3.*

INTELLIGENT COMPUTER FUNCTIONALITY AND VISUALIZATION FOR INVENTORY ITEM PLACEMENT

BACKGROUND

Various inventory management computer applications, search engine logic, and other technologies can assist users in placing items (e.g., products listed on an e-commerce platform) in fulfillment centers. A fulfillment center is the physical location from which the third-party logistics provider fulfills consumer orders for e-commerce retailers. However, such technologies include both static functionality and user interface capabilities to determine which fulfillment centers to place items in. For instance, electronic spreadsheets can repetitively store, in computer memory, manual user input of fulfillment center indicators and each item stored within each fulfillment center and then perform some basic calculation (e.g., auto summation or average) in order to give users a sense of how many items are contained in a fulfillment center. However, these electronic spreadsheets, as well as other technologies, fail to intelligently select or recommend particular fulfilment centers for placing particular inventory items in and provide navigation-friendly and intuitive user interfaces. This not only negatively affects the user experience, but also consumes an unnecessary amount of computer resources, among other things.

BRIEF SUMMARY

Particular embodiments of the present disclosure include a computer-implemented method, a non-transitory computer storage medium, and a system. Some aspects are directed to improving inventory management applications, search logic (e.g., search engines, web applications, browsers, etc.) and other technologies by generating one or more user interface elements based at least in part on consumer demand of an item in various geographical regions (e.g., states). Consumer demand can correspond to a frequency or quantity of computer user input (e.g., clicks). Such consumer demand can be computed in response to receiving an indication that a user (e.g., a retailer) needs to place an item in an inventory center, such as a fulfillment center. In this way, fulfillment centers that are associated with the greatest amount of consumer demand, for example, can be selected to transport an item to before a consumer transaction occurs. Some embodiments can use one or more machine learning models or other statistical models to predict consumer demand to select the particular inventory center. For example, some embodiments can use an exponential smoothing forecast model or regression model to predict what the particular consumer demand will be for a particular time interval (e.g., a day) for a given geographical region. Some embodiments can additionally or alternatively rank each inventory center or recommend an inventor center based on the consumer demand and/or other factors. All of this functionality not only improves upon the functionality of these existing technologies, but improves the user experience and computing resource consumption (e.g., disk I/O) relative to other technologies, as described in more detail herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 3 is a statistics table data structure that is at least partially indicative of consumer demand for a particular item over various geographical regions, according to some embodiments.

DETAILED DESCRIPTION

Figure 1:
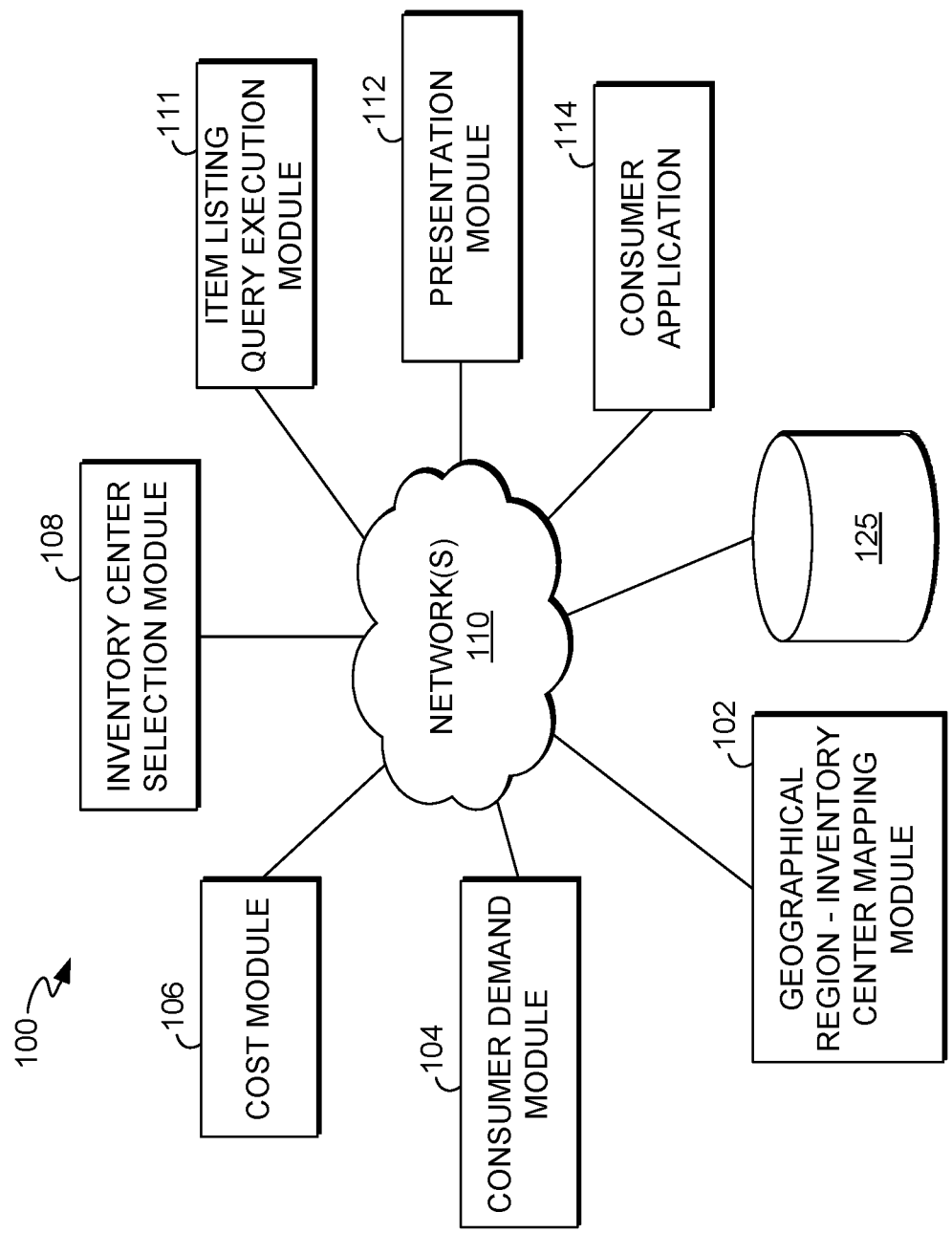
FIG. 1 is a block diagram of an illustrative system architecture in which some embodiments of the present technology may be employed, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Existing inventory management computer applications statically manage inventory. For example, applications, such as Inventory Now, Cin7, and myStock, are not integrated at all with e-commerce platforms (but are stand-alone apps that perform inventory counting for small businesses), are not scalable outside of a particular platform (e.g., a iOS), fail to employ intuitive user interfaces, and/or fail to intelligently select or rank fulfillment centers to place items in. This negatively effects the user experience and leads to poor computing performance. For instance, these applications require users to drill down several user interface pages to view each fulfillment center, whether particular items are in the fulfillment centers, and what geographical regions they are located in. This is arduous for users to navigate, thereby negatively affecting the user experience. For example, if a user wanted to view a particular fulfillment center and its associated information (e.g., the items stored to the fulfillment center), the user would have to manually page or drill down through various other fulfillment centers to get to the desired fulfillment centers. In another example, if an application required an ANDROID operating system, but the user had an iOS, the user would have to somehow get access to the correct operating system.

Existing electronic spreadsheet applications and other computer applications not only negatively affect the user experience but consume an unnecessary amount of computer resources. Such applications are configured repetitively store, in computer memory, manual user input of different fulfillment centers and each item stored to each fulfillment center and then perform some basic calculation (e.g., auto summation or average) in order to give users a sense of what fulfillment centers contain which items and the particular quantity. However, repetitively storing these inputs increases disk I/O (e.g., excess physical read/write head movements on non-volatile disk) because each time a user inputs this fulfillment center information, the computing system may have to reach out to disk to perform a read or write operation for each user input, which is time consuming, error prone, and can eventually wear on components, such as a read/write head. This also increases memory consumption by having to store each manual user input. Such excessive memory storage also increases the likelihood of memory fragmentation, memory leaks, or other memory errors. In memory fragmentation instances, for example, these manual user inputs for the fulfillment centers are not guaranteed to fit the memory heap in automated memory allocation and so there is a higher likelihood of unused memory or fragmentation.

Generating these redundant user inputs for fulfillment centers also causes excessive packet generation costs that adversely affect computer network communications, when using web applications, for example. Each time a user manually inputs information (e.g., different fulfillment centers and their inventory information) into a field and browses through or drills down various pages, a request that includes payload data (e.g., a fulfillment center name) and supplemental header information or other metadata within a packet in TCP/IP and other protocol networks must traverse over the network. Accordingly, for example, when this functionality is multiplied by all the user inputs, drilling, and browsing needed to obtain the desired fulfillment center and inventory item information, there are network utilization and latency costs by repetitively generating this metadata, payload, and sending it over a computer network.

Various search technologies are also deficient when it comes to surfacing, ranking or selecting inventory centers. These technologies receive, within a search engine field, search terms of a query corresponding to a particular resource or topic (e.g., an item listing). Responsively, one or more servers hosting the search engine logic can execute the query by ranking and retrieving data from various data sources and cause a web or app page to display various ranked search results associated with the particular resource or topic. The user may then select one or more of the various ranked search result identifiers. However, typical search engine logic is specifically built to return specific item listings, documents, web pages and the like, but does not include other functionality, such as ranking list of inventory centers (e.g., fulfillment centers) suitable to store inventory items in. Accordingly, these technologies are deficient in information retrieval for inventory center information.

Various embodiments of the present disclosure provide one or more technical solutions to the technical problems described above, as well as other problems. In operation, various embodiments of the present disclosure are directed to generating one or more user interface elements based at least in part on consumer demand of an item in various geographical regions (e.g., states) in response to receiving an indication that a user needs to place an item in an inventory center. For example, embodiments can receive, at a search engine field, a query for brand A sneakers. Responsively, some embodiments can compute the consumer (e.g., buyer) demand for brand A sneakers by accessing, in computer memory, user activity statistics or metrics (e.g., clicks, views, skips, etc.) for brand A sneakers across several states or cities to compute the consumer demand.

Alternatively or additionally, some embodiments can use one or more machine learning models or other statistical models to make predictions to compute consumer demand in order to select the particular inventory center. For example, some embodiments can use an exponential smoothing forecast model or classifier model to predict what the particular consumer demand will be for a particular time interval (e.g., a day). Responsively, particular embodiments can generate user interface elements that at least partially indicates the consumer demand. For example, some embodiments generate a bubble map over a geographical region, where the visualization of each bubble is sized over a particular geographical region based at least in part on the consumer demand. Some embodiments can additionally or alternatively rank each inventory center based on the consumer demand and/or other factors, such as the cost (e.g., in driving miles) to get an item from a seller to a particular fulfillment center and indicate as much at a user interface, as described in more detail below.

Various embodiments of the present disclosure improve existing inventory management computer applications. For example, particular embodiments are integrated with e-commerce platforms, making functionality scalable outside of stand-alone apps. For example, the items that users have requested to be placed in fulfillment centers may be the same items that are for sale at an e-commerce or electronic marketplace. For instance, as part of an onboarding or registration process for selling items at an e-commerce site, users may be prompted to list their items that they will be selling and select the particular inventory centers (e.g., via the screenshot 200 of FIG. 2) before item listings are published as search results. Some embodiments are also scalable outside of particular platforms (e.g., an iOS). For example, some embodiments are web applications that can function on any operating system or device, unlike existing inventory management applications.

Some embodiments also provide intuitive user interfaces that are user-navigation friendly and otherwise improves the user experience. For instance, instead of requiring users to drill down several user interface pages to view each fulfillment center, and see what geographical regions they are located in, some embodiments provide, to a single page, a map of each geographical region, each inventory center within each geographical region, and other information (e.g., consumer demand, cost) associated with each inventory center. This makes it easier for users to navigate. For example, if a user wanted to view a particular fulfillment center and its associated information, the user would not have to manually page through various other objects representing different fulfillment centers to get to the desired fulfillment center. Rather, the user need only navigate to a single page, which would render all of the desired information. Further, because embodiments intelligently select or rank inventory centers, users are better able to make decisions for inventor center placement, thereby improving the user experience.

Various embodiments improve other applications (e.g., electronic spreadsheets) and computer resource consumption. For example, instead of repetitively storing, in computer memory, manual user input of different fulfillment centers and each item stored to each fulfillment center to perform some basic calculation as existing electronic spreadsheets do, particular embodiments automatically (e.g., as a background task) select, rank, or recommend one or more inventory centers based on a new set of rules that existing technologies do not employ (e.g., consumer demand, cost, etc.). Accordingly, manual user inputs are not having to be stored to disk. Thus, these embodiments reduce disk I/O because the user does not have to keep inputting fulfillment center information so the computing system does not have to reach out to disk to perform a read or write operation for each user input, which is time consuming, error prone, and can eventually wear on components. This automated functionality also decreases memory consumption by not having to store each manual user input, so the likelihood of memory fragmentation, memory leaks, or other memory errors are lower. This make it more likely that the data will fit the memory heap in automated memory allocation.

Because various embodiments reduce redundant manual user inputs for fulfillment center data, there is also no excessive packet generation costs that adversely affect computer network communications. This is because the user does not have to keep manually inputting information (e.g., different fulfillment centers and their inventory information) into a field or browse through or drill down various pages (which triggers a request that includes payload data (e.g., a fulfillment center name) and supplemental header information or other metadata within a packet in TCP/IP and other protocol networks that must traverse over the network). Accordingly, for example, there are no network utilization and latency costs because these embodiments do not require repetitively generating this metadata, payload, and supplemental header information, and sending it over a computer network.

Some embodiments also improve existing search engine technologies. Various embodiments employ search engine functionality to rank inventory centers based on a query that indicates an item and a request to surface inventory centers for storing the item (e.g., based on consumer demand). As discussed above, typical search engine logic is specifically built to return specific item listings, documents, web pages and the like, but does not include other functionality, such as ranking inventory centers (e.g., fulfillment centers) suitable to store inventory items in. Accordingly, these embodiments improve information retrieval in computers because computers are not yet able to perform this functionality.

FIG. 1 is a block diagram of an illustrative system architecture 100 in which some embodiments of the present technology may be employed, according to some embodiments. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., the computer environment 800 of FIG. 8). In other embodiments, the system 100 is located at a single host or computing device (e.g., the computing device 900 of FIG. 9). In some embodiments, the system 100 illustrates executable program code such that all of the illustrated components and data structures are linked in preparation to be executed at run-time.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to selecting an inventor center to place one or more items in using an electronic marketplace platform. The system 100 includes a geographical region-inventory center mapping module 102, a consumer demand module 104, a cost module 106, an inventory center selection module 108, an item listing query execution module 111, a presentation module 112, a consumer application 114, and storage 125, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can be any combination of connections (e.g., APIs or linkers) or protocols that will support communications between the components of the system 100.

The geographical region-inventory center mapping module 102 is generally responsible for generating a mapping (e.g., via a hash table) that maps one or more geographical regions to one or more inventory centers. A "geographical region" is any suitable real-world area, the boundaries of which can be predetermined or dynamically determined. For example, a predetermined geographical region can be a state, city, zip code, country, neighborhood, sub-division, apartment complex, and/or the like. An example of a dynamic geographical region can be a geofence. A geofence is a virtual boundary (e.g., a graphical user interface lasso superimposed over a neighborhood) or perimeter that can change its boundaries. Geofencing is a location-based service in which an app or other software uses GPS, RFID, Wi-Fi and/or cellular data to trigger a pre-programmed action when a mobile device or tag (e.g. RFID) enters or exits a virtual boundary of a geofence.

An "inventory center" refers to a physical location that is capable of or is configured to store items. For example, an inventory center can be a fulfillment center. Before a buyer receives an item purchased from an e-commerce platform, the seller may send the item to a fulfillment center, and an outsourced third-party logistics (3PL) provider ships the item to the buyer. A fulfillment center is the physical location from which the third-party logistics provider fulfills buyer orders for ecommerce retailers. Likewise, an inventory center can be the location from which the third-party logistics provider fulfills buyer orders for ecommerce retailers or any other sellers (e.g., a private seller). A fulfillment center exists to get online orders to buyers in a timely fashion and relieve ecommerce companies of managing this process.

Sellers often arbitrarily select fulfillment centers to place their inventory in without regard to shipping costs and delivery speed, for example. Inventory centers can also represent other facilities that are at least capable of storing items though these facilities might have other or additional purposes. For instance, an inventory center may be a retailer or other place of business, a warehouse, a locker, an access point, and the like.

In various embodiments, each inventory center indicated by the geographical region—inventory center mapping module 102 is a candidate to store or transport one or more items, which may be items for sale in an electronic marketplace. Mapping particular geographical regions to inventory centers via the geographical region-inventory center mapping module 102 is used to determine an identity and the quantity of inventory centers that are in one or more geographical regions for further downstream processing, as described in more detail herein.

The consumer demand module 104 is generally responsible for determining or computing the consumer demand of one or more items (e.g. products for sale at an electronic marketplace) for one or more geographical regions. "Consumer demand" of an item as described herein, refers to the quantity or count of user activity (e.g., purchase clicks) that various users have and/or will perform for a given item for a given time period or a particular point in time. "User activity" can include any type of computerized computer input, such as a click, view, buy, skip, and the like, as described in more detail. In some embodiments, consumer demand alternatively or additionally refers to real-world actions, such as physical sales at a brick-and-mortar store, as opposed to user activity data. The specific consumer demand (e.g., a "high" consumer demand) can be determined based on whether the user activity surpasses or is outside of some threshold count (e.g., there were 20 clicks for an item) or is under some threshold count (there were only 2 skips).

In some embodiments, the consumer demand is mapped to particular geographical regions based on programmatically calling or communicating with the geographical region inventory center mapping module 102 in order to determine what geographical regions exist and then calculating the consumer demand for those regions. For example, the consumer demand module 104 can receive a list of each geographical regions stored to a data structure by the geographical region-inventory center mapping module 102.

In some embodiments, the consumer demand is additionally or alternatively mapped to particular geographical regions based on the user activity that occurred within the particular geographical regions. This can occur in any suitable fashion. For example, when a user device establishes a communication session (e.g., via a SYN, ACK, and SYN-ACK handshakes) with an electronic marketplace server, a geocoded indicator, indicating the user's geographical location can be passed in a TCP/IP packet to the electronic marketplace server. Alternatively or additionally, an IP address of the user device, which indicates the geographical location, can be transmitted to the electronic marketplace server. Alternatively or additionally, a GPS module located at a user device can pass the user device's geo-coordinates to the electronic marketplace server. Subsequently, the user can "click" on an item listing. Responsive to this user activity, the consumer demand module 104 can map the geocoded indicator, IP address, or GPS coordinates to a particular geographical region (e.g., a city indicated in the mapping of the geographic region-inventory center mapping module 102), and then responsively map the geographical region to the user activity that occurred there for that item.

In some embodiments, the consumer demand module 104 alternatively or additionally computes consumer demand by using one or more machine learning models (e.g., a deep neural network) and/or statistical models (e.g., Bayesian inference, exponential smoothing, etc.). In some embodiments, these models can estimate or predict what the consumer demand will be at a given point in time or time range given past consumer demand as inputs. Machine learning models, for example, can learn, via training, fine-tuning, and testing on past click metrics, particular patterns or relationships among purchases for an item given the particular day and responsively predict the consumer demand. For example, a machine learning model may predict that a particular geographical region has historically purchased a specific green item on a specific weekend in the year (e.g., due to a large Irish festival). Accordingly, the machine learning model may predict that the consumer demand for the specific green item will be high at the same geographical region during the same time span next year, but will be low the rest of the year and for all times of the year for other geographical regions. Machine learning functionality is described in more detail below.

In some embodiments, the cost module 106 is responsible for computing a cost for transporting an item from a particular location (e.g., a seller's residential address or retailer's business address) to an inventory center. Alternatively or additionally, the cost module 106 is responsible for computing a cost for transporting the item from the inventory center to a particular destination location (e.g., a final-mile delivery location of a buyer), in order to complete the buyer transaction request to purchase the item. In various embodiments, "cost" can refer to one or more values that indicate monetary cost to transport the item, fuel costs (e.g., in gallons) to transport the item, cost in distance (e.g., in miles) to transport the item, costs in time (e.g., by the hour) to transport the item, and/or costs in resources (e.g., the quantity of workers that it takes to transport the item). In an illustrative example, a seller may be located only 2 miles away from a first inventory center, and 800 miles away from a second inventory center. Accordingly, the cost in terms of money, fuel, distance, time, and resources to transport an item to the second inventory center is higher than the cost to transport the item to the first inventory center because it is closer to the seller.

In some embodiments, the cost is at least partially computed based on the consumer demand. For instance, the higher the consumer demand, the lower the cost and the lower the consumer demand, the higher the cost. For example, if an electronic marketplace determines that buyers in a particular geographical regions are much more likely to buy an item relative to other geographical areas, the cost may be lower for that item, since the likely buyer will have reduced shipping costs based on the inventory center being physically close to the buyer.

In some embodiments, the cost module 106 locates the specific inventory center for computing a cost for transporting an item from a particular location (e.g., a seller's residential address or retailer's business address) to the inventory center by programmatically calling or communicating with the geographical region-inventory center mapping module 102. For instance, the cost module 106 can calculate the cost for each inventory center listed in a data structure by the geographical region-inventory center mapping module 102. In some embodiments, as similarly described above, a seller's location can be determined to determine cost based on receiving a geocoded indicator, IP address, and/or geo-coordinates upon a communication session being established in order to, for example, to determine the distance from the seller's location to each inventory center.

The inventory selection module 108 is generally responsible for selecting an inventory center to place an item in (e.g., based on a user request). Such selected inventory center may be chosen among other candidate inventor centers to place one or more items in so that items can be transported from a location (e.g., a seller's address) to the selected inventory center and later transported from the selected inventory center to a destination location (e.g., a buyer's address) to complete a purchase transaction.

In some embodiments, such selection by the inventory selection module 108 is made based at least in part on the consumer demand for that item in particular geographical regions and/or the cost for transporting that item. In other words, for example, before the inventory selection module 108 performs its functionality, it can programmatically call and send a computer-readable program instruction to the consumer demand module 104 and/or the cost module 106 in order to derive a consumer demand for each inventory center for each geographical region of a first item, as well as the cost it takes to transport the first item in order to select the appropriate inventory center. For example, in some embodiments, the inventory selection module 108 automatically selects, or causes presentation at a user interface, a first inventory center to place the first item in based on the consumer demand meeting a threshold (e.g., the most clicks relative to other geographical regions) and/or the cost, in dollars, for transporting the first item from the seller's location to the first inventory center being under a threshold. Although this example describes the selection being automatically done, in some embodiments, the inventory section module 108 selects the inventory center based on a user request or receiving an indication that a user has selected the first inventory center, for example.

In some embodiments, the inventory selection module 108 additionally or alternatively ranks one or more inventory centers that are within one or more geographical regions based at least in part on the consumer demand (and/or cost) of the item at each geographical region. And based on the ranking, the inventory selection module 108 can recommend an inventory center to store an item to or at least visually present the inventory centers based on the ranking. For example, for a first item, the consumer demand at a first inventory center within a first geographical region may be highest and the consumer demand at a second inventory center within a second geographical region for the first item may be the lowest. Accordingly, the inventory selection module 108 may rank the first inventory center the highest and the second inventory center the lowest and responsively cause presentation of an identifier that indicates the first inventory center at the top of a page and another identifier of the second inventory center at the bottom of the same page. This mere positioning can indicate that particular embodiments "recommend" the first inventory to transport or store the first item to. In other embodiments, the recommendation may be explicit, such as via a pop-up window or message that states that the first inventory is recommended.

In some embodiments, the inventory selection module 108 additionally causes an actual transportation of the item to the selected inventory center. For example, in response to the selection, in some embodiments, the inventory selection module 108 sends a control signal to an unmanned aerial vehicle (UAV), an autonomous vehicle, unmanned ground vehicle (UGV), or the like, which has a radio to receive the control signal that activates these machines and requests a traversal to a seller's location and pickup of the item and traversal to the selected inventory center. Accordingly, these machines are configured to traverse to the seller's location (e.g., a user device's GPS coordinates or address) and is configured to load the item and transport it to the selected inventory center. Alternatively (or additionally), in some embodiments, causing the actual transportation can include sending a notification or signal to a user device, such as a carrier device (e.g., a DIAD). In this way, the carrier entity or logistics provider can pick up the item from the seller's location and transport the corresponding item to the selected inventory center based on the notification received.

The item listing query execution module 111 is generally responsible for executing queries to return item listings as search results to users. In some embodiments, an "item listing" as described herein refers to a description (e.g., in natural language) and/or indication (e.g. a photograph) of an item that is for sale in an electronic marketplace. For example, the item listing can include an image that represents an item for sale and an item title that summarizes key attributes of the item for sale, such as a name and price of an item. An "item" in these embodiments is the tangible real world product or good and/or service that is for sale at an electronic marketplace. Alternatively or additionally, an item listing refers to a document, file, link, web page, identifier, or any search result that indicates the item listing's source (e.g., a URL in a web browser search engine).

An "electronic marketplace" as described herein refers to any mobile app, web application (e.g., an e-Commerce web application), or any suitable computer application that includes functionality for executing users' requests or queries to purchase one or more items. In some embodiments, an electronic marketplace facilitates consumer-to-consumer transactions (e.g., private seller to private buyer). Alternatively or additionally, the electronic marketplace facilities business-to-consumer transactions. In some of these embodiments, entities (e.g., corporations) may provide item listings describing items on their website for consumer purchase without letting private sellers sell items. It is understood that an electronic marketplace need not refer to the entire or main functionality of a given application. Rather, an electronic marketplace can refer to a particular set of routines, functions, or portion of a larger application. For example, a web application may correspond an education web application that allows users to sign up for classes, while at the same time including an electronic marketplace to purchase items (e.g., books).

In an illustrative example of the item listing query execution module 111, it can receive a user request for an item listing that indicates a first item (e.g., that was caused to be transported to an inventory center via the inventory center selection module 108). The user of the user request can be located at a first geographical region. In response to receiving the user request, the item listing query execution module 111 can cause presentation of the item listing as a search result on a search results page to execute the user request. Subsequently, the item listing query execution module 111 can receive a user selection of the search results at the search results page. In some embodiments, the item listing query execution module 111 causes transportation of the item from the first inventory center to a destination location (e.g., address, geo-coordinates of the user device, etc.) associated with the user and the first geographical region (e.g., an address within the first geographical region or geo-coordinates that are within the first geographical region). In some embodiments, the "cause" of transportation occurs via a notification to a carrier device or control signal to a machine as described with respect to the inventory center selection module 108 to cause the item to be transported from the first inventory center to the destination location.

In some embodiments, the item listing query execution module 111 includes a query processor that is responsible for executing a query (e.g., via query optimizer, selectivity, and cardinality) at runtime in order to rank and render search results according to the query. The search query processor can rank item listings as search results based on terms in a query. Any suitable search engine functionality may be employed for ranking. For example, algorithms used by the query processor may be or include: TF-IDF, WORD2Vec, PageRank (PR) algorithm, and the like.

The presentation module 112 is generally responsible for causing presentation (e.g., display) of data on a user device. In some embodiments, such presentation is in the form of a user interface. Such user interface may be a graphical user interface (GUI), and/or a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on a user device.

In some embodiments, the presentation module 112 causes presentation of content and related information to user devices, such as a page based on the functionality of the geographical region— inventory center mapping module 102, the consumer demand module 104, the cost module 106, the inventory center selection module 108, and/or the item listing query execution module 111. For example, the presentation module 112 may cause a list of ranked inventor centers, as well as the corresponding consumer demand for the items in the geographical regions that include the inventory centers. The presentation module 112 may comprise one or more applications or services on a user device, across multiple user devices, or in the cloud. For example, in one embodiment, presentation module 112 manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation module 112 generates user interface features. Such features can include interface elements (such as graphics buttons, sliders, menus, audio prompts, alerts, alarms, vibrations, pop-up windows, notification-bar or status-bar items, in-app notifications, bubble data objects, or other similar features for interfacing with a user), queries, and prompts. In some embodiments, the presentation module 112 generates structured data, tagged data or otherwise causes presentation of structured or tagged data that was previously unstructured, semi-structured, or untagged.

The consumer application 114 generally refers to one or more computer applications or services, such as online/cloud applications or locally stored apps that consume or utilize the information determined by system 100. In particular, the consumer application 114 may receive query requests for users to place items in particular inventory centers and/or query requests for particular item listings. In some embodiments, a consumer application 114 may utilize a presentation module 112 to provide information. Examples of consumer applications 114 may include, without limitation, electronic marketplace applications or platforms, inventory management applications, email, messaging, chat, or calling; project management; calendar or scheduling; and task list or to-do applications, and the like.

Storage 125 refers to any suitable data store, such as a relational database, a corpus of data, a data warehouse, main memory, disk, and/or the like. The storage 125 can store any suitable set of data structures, routines, functions, machine learning models, statistical models, and/or any information. For example, storage 125 can store item listings in an electronic marketplace, data structures used by the geographical region—inventory center mapping module 102 and the like.

Figure 2:
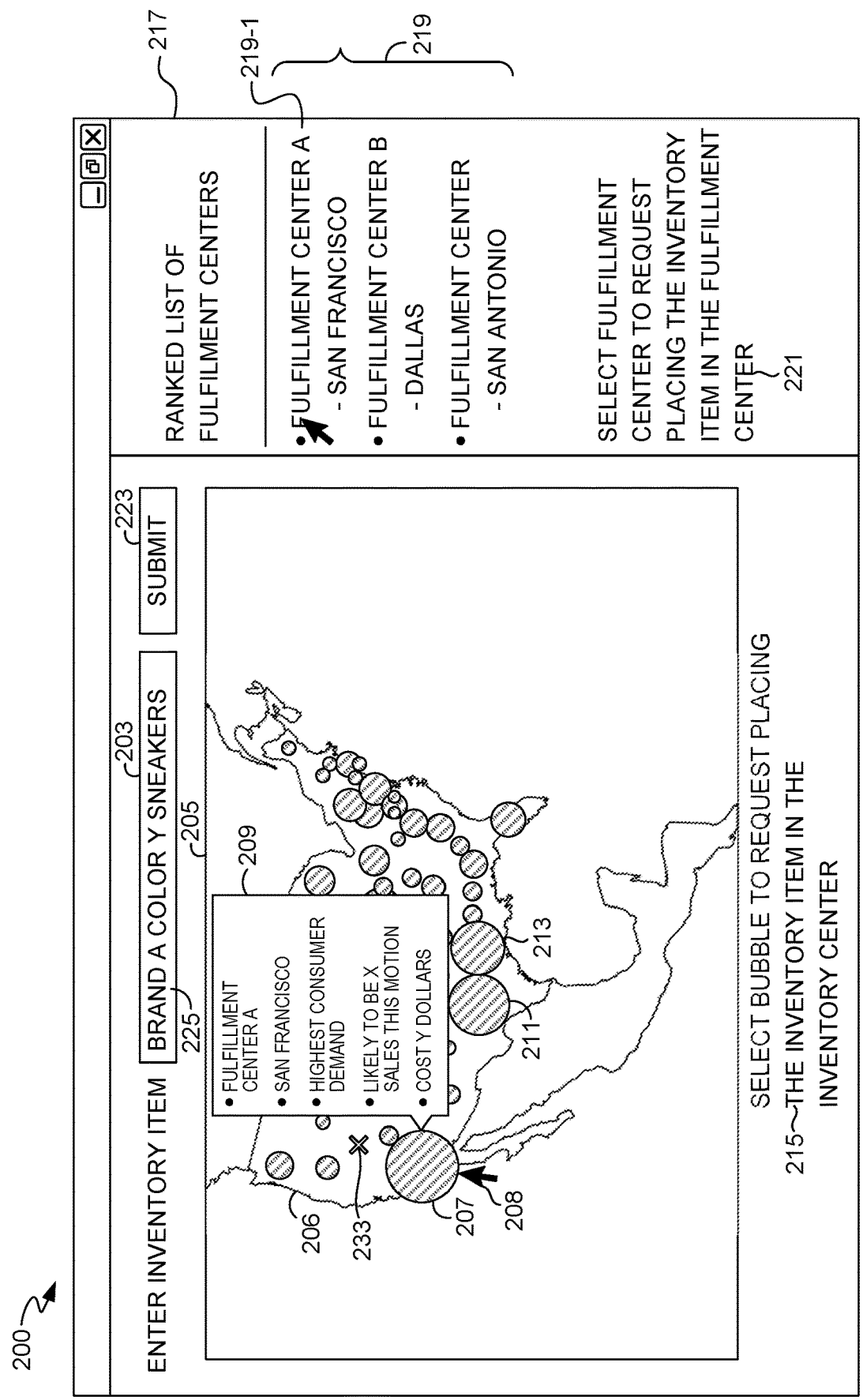
FIG. 2 is a screenshot of an example user interface, according to some embodiments.

FIG. 2 is a screenshot 200 of an example user interface, according to some embodiments. In some embodiments, the screenshot 200 is caused to be displayed by the presentation module 112 of FIG. 1. Likewise, in some embodiments, the screenshot 200 is a part of the consumer application 114 of FIG. 1. In some embodiments, the screenshot 200 is a part of an electronic marketplace application that is surfaced based on a user generating an item listing so that the user must specify which inventory center the user will place certain items in before the corresponding item listing is published or goes live on the electronic marketplace platform so that buyer users can purchase the corresponding items.

The screenshot 200 indicates the improvement to existing user interfaces, as described herein, by consolidating all the necessary information to a single page as indicated in the screenshot 200. Further, at the screenshot 200, the user will be able to see the consumer demand and/or cost of an item for each geographical area (e.g., state) and the user will likely select the corresponding inventory center where the consumer demand is the highest and/or the cost is the lowest. This effectively reduces transporting or shipping costs and delivery speed to buyers since the item will be physically placed close where buyers are likely to buy it and/or physically placed close to where the seller resides.

The search engine field 203 is configured to receive a user query 225—"Brand A color Y sneakers"—which is indicative of a request that a user needs to place the corresponding item in an inventory center. In response to receiving an indication that the user has selected the submit button 223 (to submit the query 225), various embodiments compute the consumer demand (e.g., as described with respect to the consumer demand module 104) of the Brand A color Y sneakers item for multiple geographical regions and the cost (e.g., as described with respect to the cost module 106) to transport or store the Brand A color Y Sneakers item to each candidate inventory center.

Responsive to calculating such consumer demand and/or cost, various embodiments cause presentation of the bubble map 205 (or UI elements within the bubble map 205) and/or the ranked list inside the window pane 217. The bubble map 205 is a visualization that indicates the United States UI element 206, as well as various geographical regions or states within the UI element 206. The bubble map 205 also displays bubble data objects (e.g., 207, 211, and 213) that indicate where, across the various geographical regions, inventory center candidates to place items in are located. In some embodiments, the size of each bubble data object indicates the particular consumer demand for the corresponding item (the "Brand A color Y sneakers") and for the particular geographical region. Additionally or alternatively, in some embodiments, the size of each bubble data object indicates the cost to transport the corresponding item from the user's location, indicated by the X mark 230, to the respective inventory center candidate. In some embodiments, the display of actual bubble data objects or inventory centers inside the particular geographical regions is based on determining which inventory centers are located in which geographical regions, as determined, for example, by the geographical region— inventory center mapping module 102.

Although the screenshot 200 indicates a very specific bubble map 205 and a ranked list of fulfillment centers, it is understood that this is representative only and that any suitable user interface elements may exist (e.g., as described with respect to the presentation module 112 of FIG. 1). For example, consumer demand and/or cost may be illustrated by colors, symbols, dials, or explicit messages alternative or in addition to a bubble data object.

The bubble map 205 specifically indicates that the that a first inventory center corresponding to the bubble data object 207 is in a geographical region (i.e., San Francisco) that has the highest consumer demand (and/or cost) for the corresponding Brand A color Y sneakers item relative to other geographical regions and inventory centers. Likewise, the bubble map 205 indicates that a second set of inventory centers corresponding to the bubble data objects 211 and 213 are in geographical regions (i.e., San Antonio and Dallas) that have less consumer demand than in San Francisco, but more consumer demand than any of the other cities in the particular states that have candidate inventory centers.

In some embodiments, in response to receiving an indication that the mouse pointer 208 is hovering over (but no actual selection) the bubble data object 207 (or any other bubble data objects), particular embodiments cause the pop-up window 209 (or similar pop-up windows) to be displayed. The pop-up window 209 indicates an identity or ID (i.e., "fulfillment center A") of the fulfilment center that the bubble data object 207 represents. It further indicates the geographical region (i.e., San Francisco) that the particular fulfilment center is in and whose consumer demand (and/or cost) is calculated for. It further indicates the ranking or position, among all of the other geographical regions, of consumer demand (i.e., San Francisco is the "highest consumer demand" for the item). The pop-up window 209 further indicates machine learning model or statistical model predictions associated with the consumer demand (i.e., "likely to be X sales this month"). Lastly, the pop-up window 209 indicates the cost (i.e., "cost Y in dollars") for transporting the Brand A color Y sneakers item from the seller's location 230 to fulfillment center A.

The indicia 215 prompts the user to select a bubble to request placing the corresponding inventory item in the corresponding inventory center. For example, in response to receiving an indication that the user has clicked the bubble data object 207, the inventory center selection module 108 as described with respect to FIG. 1, can select fulfillment center A in San Francisco to transport the Brand A color Y sneakers item to (e.g., as opposed to the fulfillment centers indicated by the bubble data objects 211 and 213).

The window pane 217 indicates a ranked list of fulfillment centers 219. In some embodiments, the fulfillment centers are ranked according to the consumer demand for the corresponding geographical region and item and/or the cost to transport the item from the seller's location 230 to the corresponding fulfillment center. The window pane 217 specifically illustrates that the fulfillment center A 219-1 is ranked highest (e.g., because it is the highest oriented fulfillment center) relative to the other fulfillment centers. In some embodiments, in response to receiving an indication that the pointer 208 is hovering over the fulfillment center A indicia 219-1, the pop-up window 209 is caused to be displayed so that the user can receive more specific information about the particular fulfillment center.

The indicia 221 prompts a user to select a fulfillment center to request placing the inventory item in the corresponding fulfillment center, similar to the indicia 215. Accordingly, for example, in response to receiving an indication that the user has selected the indicia 219-1, the inventory center selection module 108 can select the fulfillment center A as the fulfillment center to store the Brand A color Y sneakers to (and not fulfillment center Z or X).

FIG. 3 is a statistics table 300 data structure that is at least partially indicative of consumer demand for a particular item over various geographical regions, according to some embodiments. In some embodiments, the consumer demand module 104 generates, populates, and/or uses the statistics table 300 to compute consumer demand for an item over various geographical regions.

The statistics table 300 specifically indicates the particular counts or quantity of user activity according to specified attributes—i.e., the "view frequency", "purchase frequency", "skip frequency", "watch frequency", and "bid frequency" statistics. The "view frequency" attribute corresponds to the quantity of times users have selected or clicked an item listing (e.g., in response to a query) to read about or otherwise engage in further user activity. The "purchase frequency" attribute corresponds to the quantity of times users have made a selection to buy or purchase the corresponding item (e.g., checked out the item in a shopping basket or entered in credit card information to purchase the item). The "skip frequency" attribute corresponds to a quantity of times one or more users have skipped or made selections to not purchase, to disregard, or not bid on one or more items. For example, if various results are returned to a web results page and a user only selects one of the results, the consumer demand module 104 may identify each result that was not selected an increment the statistics table 300 according indicating that each of these items were not selected (e.g., via a negative integer score).

The "watch frequency" attribute corresponds to a quantity of times one or more users have selected one or more items to follow through a bidding process. For example, a user may have selected 30 items that he/she is interested in following through a bidding process without necessarily bidding or purchasing the items. Accordingly, each time a user selects an identifier to follow one or more items through a bidding process, the consumer demand module 104 may update the statistics table accordingly.

The "bid frequency" attribute corresponds to a quantity of times one or more users have bid or made a selection to put or generate an offer on one or more items regardless of whether the one or more users have actually purchased such item. For example, if a first item is popular, it may be associated with a lot more bids than a second item, which can then be scored higher for query result sets.

Although the statistics table 300 illustrates specific metrics, it is understood that any other metrics can be used in addition or alternative to those listed in the table 300. For example, some embodiments alternatively or additionally use Ask Seller a Question (ASQ) frequency and Buy-it-Now (BIN) frequency. ASQ frequency corresponds to selections associated with asking a seller one or more questions about one or more items. For example, before purchasing an item a buyer may select an identifier (e.g., an icon) that responsively provides a field for a user to input a question about a particular product. This may facilitate a smooth bidding processes as buyers can obtain more information about a product before bidding on or purchasing a particular product. Accordingly, the consumer demand module 104 may log each time a user makes such a selection to input a question about a product. In some embodiments, each string or character set (e.g., symbols or integers) are parsed from the input question the user asked and analyzed (e.g., via Natural Language Processing (NLP)) in order to identify what item to associate a statistic with and/or score relevancy for terms. For example, a user may input the question of "I'll only buy sunglasses with high definition lenses so which type of lenses do they have?" Some or each of these terms may then be parsed, analyzed, and put through a tokenizer to be plotted within the statistics table 300.

A BIN frequency corresponds to a quantity of times one or more users have selected one or more identifiers to buy one or more items instead of bidding on the one or more items. In these embodiments, a selection is made to complete a purchase of an item. For example, a graphical user interface button may include the indicia "buy it now." In response to a user selection of this button, payment information may be requested from a user such that the user can buy the item immediately. Accordingly, each time a user selects the button, the consumer demand module 104 may increment the statistics table 300 indicating that one or more users have selected this particular button.

The consumer demand for the Brand A color B sneakers item can be computed in any suitable fashion using some or all of the counts indicated in the statistics table 300. For example, the consumer demand module 104 may determine that the consumer demand for geographic region A is the highest relative to the other geographical regions based only on the purchase frequency of geographic region A (i.e., 43) being higher than any other purchase frequency within the other geographical regions.

Alternatively, a combination of the frequency statistics from some or each of these attributes can be aggregated, concatenated, and or weighted to compute the consumer demand. For example, for geographic region A, based on the view frequency being 120 a first consumer demand integer (e.g., 1) can be incremented directly proportional to the view frequency (e.g., from integer 1 to 12). And based on the purchase frequency being 43, the 12 integer score can be incremented directly proportional to the purchase frequency (e.g., to 14), and the same functionality can be performed for the rest of the attributes in the statistics table 300. Examples of weighting include adding or otherwise aggregating each consumer demand value by a specific weight value that directly indicate the importance of the consumer demand. For example, "purchase frequency" may be more indicative of consumer demand relative to "view frequency." Accordingly, a consumer demand value can be multiplied by 8 (representing the purchase frequency weight) and only multiplied by 2 (representing the view frequency) to arrive at a final consumer demand integer value. Some embodiments alternatively or additionally compute consumer demand based on machine learning functionality, as described in more detail below.

In some embodiments, the counts in the statistics table 300 represent a particular point in time or time period (e.g., last month's user activity data). In this way, the statistics table 300 can periodically (e.g., in batched mode) or in near real-time be updated based on a particular quantity of time that passes by.

Figure 4:
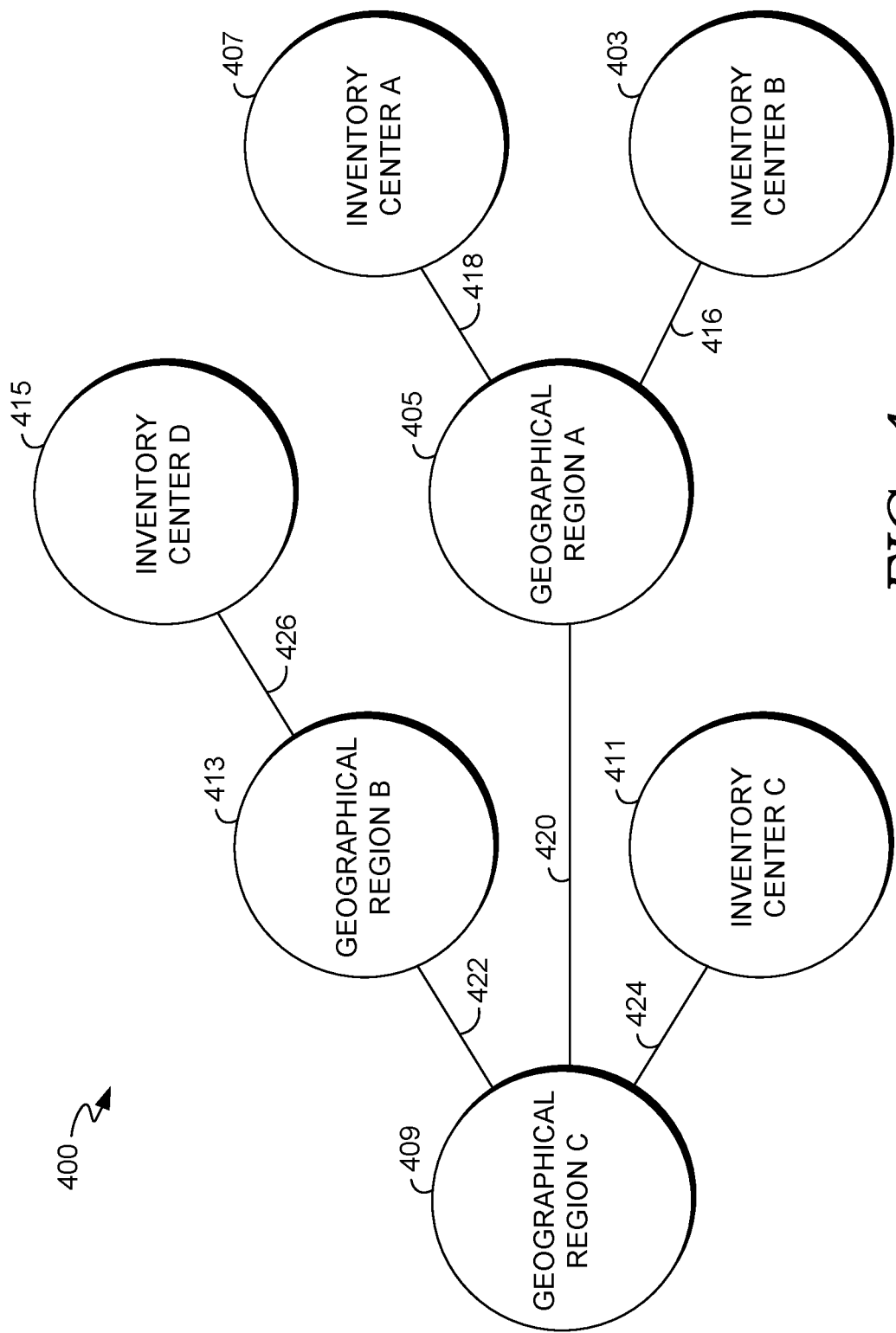
FIG. 4 is a schematic diagram of an example graph structure, according to some embodiments.

FIG. 4 is a schematic diagram of an example graph structure 400, according to some embodiments. In some embodiments, the graph structure 400 is used by the geographical region—inventory center mapping module 102 to map specific geographical regions to specific inventory centers. Alternatively or additionally, in some embodiments, the graph structure 400 is used by the consumer demand module 104, the cost module 106, the inventory center selection module 108, and/or the presentation module 112 in order to compute consumer demand for particular geographical regions, compute costs for specific inventor centers, select inventor centers for any one given item, or present a map of various geographical regions and the inventory centers that are within each geographical region.

In some embodiments, the graph structure 400 represents a network graph. A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, for example, the graph structure 400 (e.g., an undirected graph) includes the nodes or vertices of—403, 405, 407, 409, 411, 413, and 15. The graph structure 400 further includes various edges linking the nodes, such as the edges 416, 418, 420, 422, 424, and 426.

The graph structure 400 specifically shows the relationships between various geographical regions and items. Specifically, the graph structure 400 indicates which geographical regions exist and the particular inventory centers that are within the particular geographical regions. In some embodiments, the quantity (or thickness) between particular nodes represents the strength of relationship between nodes. For instance, geographic region A (represented by node 405) may include both inventory center A (represented by node 407) and inventory center B (represented by node 403). However, the diameter of edge 418 may be thicker in diameter relative to edge 416, indicating that inventory center A is proportionately closer (depending on the thickness of the edge) to geographical region A than inventory center B is. Such functionality can be used to determine cost (e.g., as described with respect to the cost module 106 of FIG. 1) and/or consumer demand (e.g., as described with respect to the consumer demand module 104 of FIG. 1).

Alternatively or additionally, "distance" can be used to determine cost, consumer demand, and/or spatial relationships between geographical regions or inventory centers. In some embodiments, a "distance" in terms of network graphs corresponds to a number of edges (or edge sets) in a shortest path between vertex U and vertex V. In some embodiments, if there are multipole paths connecting two vertices, then the shortest path is considered as the distance between two vertices. Accordingly, distance can be defined as d(U,V). For instance, the distance between node 405 and node 413 is 2 (i.e., there are two edges 420 and 422 between nodes 405 and node 413), whereas the distance between node 405 and node 409 is 1 (i.e., there is only 1 edge 420 between nodes 405 and 409). This may indicate, for example, that geographical region C is closer in the real-world to geographical region A is than geographical region B is to A for spatial presentation at a user device.

Figure 5:
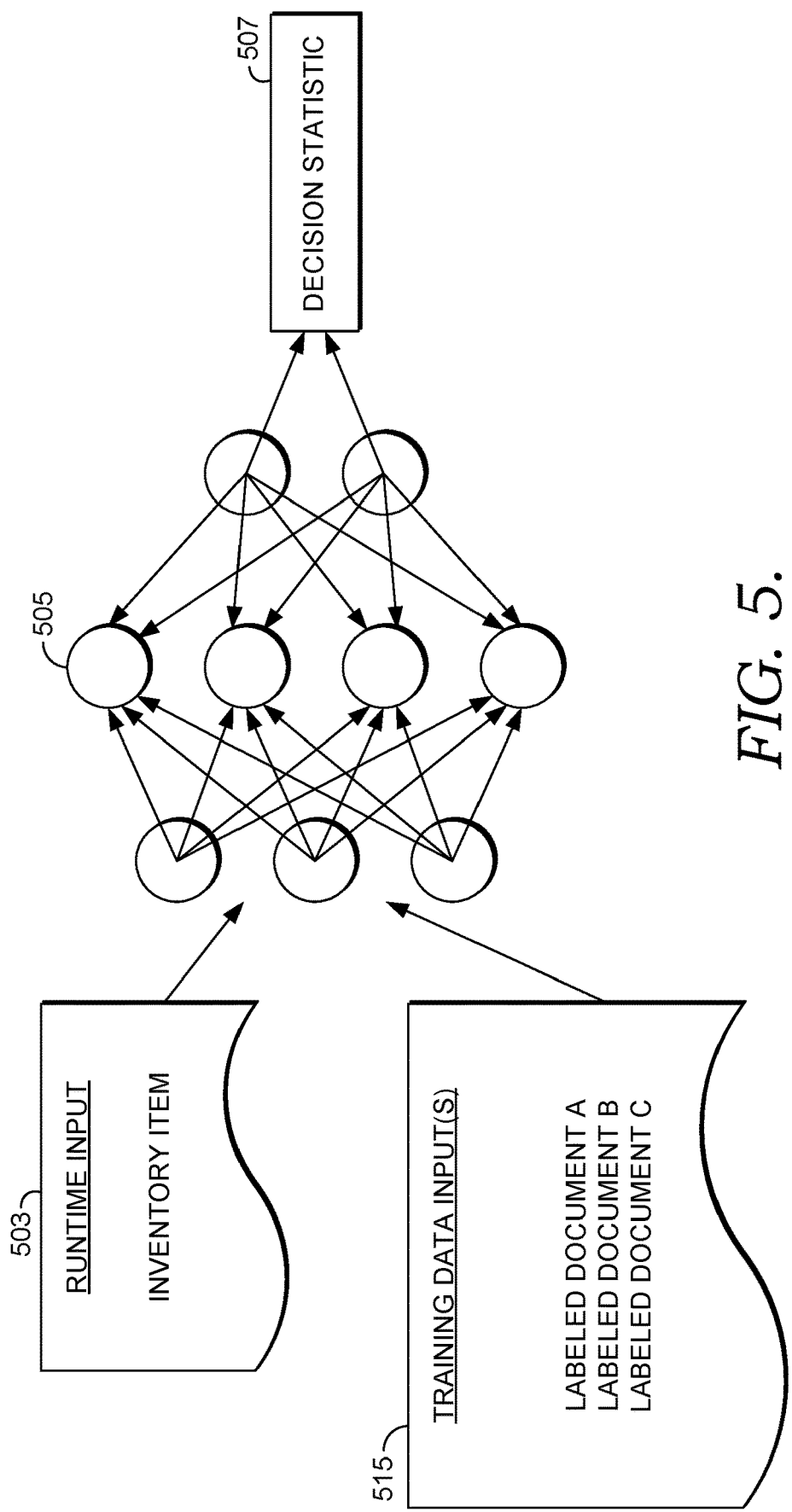
FIG. 5 is a schematic diagram illustrating how a decision statistic is generated using one or more machine learning models, according to some embodiments.

FIG. 5 is a schematic diagram illustrating how a decision statistic is generated using one or more machine learning models, according to some embodiments. In some embodiments, FIG. 5 represents or includes the data and functionality used by the consumer demand module 104 of FIG. 1. FIG. 5 illustrates that the runtime input 503 (e.g., the query 225 of FIG. 2) is fed or processed through the one machine learning model(s) 505 to make a prediction, such as a predicted consumer demand for a particular geographical region for the specific input 503. Alternatively or additionally, the one or more machine learning model(s) 505 can predict future sales or the runtime input 503 for the particular geographical region.

The one or more machine learning models 505 generates one or more particular decision statistic predictions 507 (e.g., a classification prediction of a classifier model, a clustering prediction of a clustering model, or a regression prediction for a regression model) given the runtime input 503 and the training data input(s) 515. Such machine learning model(s) 505 may be any suitable model of any suitable type. For example, such machine learning model(s) 505 can be supervised or unsupervised and can be or include a neural network (e.g., a Convolutional Neural Network (CNN) or Siamese Neural Network), decision trees, random forests, support vector machine, Naïve Bayes, and or clustering (e.g., K-means clustering). Accordingly, although the machine learning model(s) 505 is represented as a neural network, it is understood that any suitable machine learning model (or combination of models) can alternatively or additionally be used. In an illustrative example of the decision statistic(s) 507, the machine learning model(s) 505 may cluster or classify a feature vector representing some or all of the input(s) 503 in a cluster or group indicating that there will likely be X sales for geographical region A at time Y.

In certain embodiments, the decision statistic(s) 507 may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem.

In some embodiments, the machine learning model(s) 505 converts or encodes the runtime input 503 and/or training data input(s) 515 into corresponding feature vectors in feature space. A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features. For example, a feature vector may represent a document describing a geographical region's past user activity. "Feature space" or "vector space" as described herein refers to a set of all possible values (e.g., parameter values) for a chosen set of features from the data.

In various embodiments, the machine learning model(s) 505 learn, via training, parameters or weights so that similar features are closer (e.g., via Euclidian or Cosine distance) to each other in feature space. A "weight" in the context of machine learning represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores. In an illustrative example of weighting in the context of neural networks, if most historical user activity documents for a given geographical regions exhibited a range of user activity for a specific time period, that range for the specific time period may be associated with a neural node that is activated or strengthened.

In some embodiments, this training is done in supervised manner using a loss function (e.g. Triplet loss or GE2E loss) to determine how much a prediction deviates from the ground truth (e.g., labeled data sets). Loss functions learn to reduce the error in prediction. Training can occur on one or more of the data input(s) 515, such as documents for items that are labeled by geographic region, item ID, and/or date. For example, document A can include a statistics table identical or similar to the statistics table 300, which can be fed to the machine learning model(s) 505 in order to encode each value in a feature vector and embed in feature space. Document B can also include a statistics table similar to the statistics table 300, which can also be fed to the machine learning model(s) 505 to be aggregated with (e.g., via a dot product) with the feature vector embedding of document A.

Some embodiments learn an embedding of feature vectors based on learning (e.g., deep learning) to detect similar features between training data input(s) 515 in feature space using distance measures, such as cosine (or Euclidian) distance. For example, each labeled training data input 515 is converted from string or other form into a feature vector where each value or set of values represents the individual count (e.g., "purchase frequency" values). In some embodiments, feature space (or vector space) is a collection of feature vectors that are each oriented or embedded in space based on an aggregate similarity of features of the feature vector. Over various training stages or epochs, certain feature characteristics for each training input(s) 515 can be learned or weighted. For example, for each of a plurality of documents labeled as geographical region A and Item Y, embodiments can learn that for the time range between month 1 and month 2 there was a consumer demand average of Z value, as represented in the output feature vector.

In some embodiments, learning or weighting includes changing an embedding in feature space of a feature vector as more training epochs occur. For example, after a first round or epochs of training, it may be unknown which of the extracted values are important for taking on a certain classification or prediction. Accordingly, each feature for each label (e.g., item, geographical region) may take on equal weight (or close to equal weight within a threshold, such as a 2% changed weight) such that all of the input feature vectors are substantially close or within a distance threshold in feature space. For example, the consumer demand of a particular item for a particular geographical area may be similar as indicated by the closeness of distance between the feature vectors each representing different geographical region consumer demand for the same item. However, after several rounds of training or any threshold quantity of training, these same feature vectors may adjust or change distances from each other based on the feature value similarity. The more features of two feature vectors that match or are within a threshold value, the closer the two feature vectors are to each other, whereas when features do not match or are not within a threshold value, the further away the two feature vectors are from each other. It is understood that while FIG. 5 illustrates that the training data inputs 515 represent labeled inputs, as can be done in supervised learning, the inputs 515 can represent non-labeled data, such as non-supervised clustering machine learning model data where no label is given.

Various embodiments convert the training data input(s) 515 into a feature vector and map it in vector space by aggregating (e.g. mean/median or dot product) the feature vector values to arrive at a particular point in feature space. In other words, an embedded feature vector in vector space represents aggregated counts according to geographical region, item, and/or time that is oriented in vector space based on a combination of all of its values, where each value represents a dimension (or axis). For example, a plurality of documents that represent the purchase frequency for geographical region A can be aggregated into a single feature vector and embedded in feature space via mean, median, or dot product functionality.

In various embodiments, subsequent to the machine learning model(s) 505 training on the training data input(s) 515 (and/or testing), the machine learning model(s) 505 (e.g., in a deployed state) receives the runtime input 503. In various embodiments, In some embodiments, the input 503 is automatically converted to one or more feature vectors and mapped in the same feature space as vector(s) representing the training data input(s) 515. Responsively, some embodiments determine a distance (e.g., a Euclidian distance or cosine) between the one or more feature vectors and other vectors representing the training data input(s) 515, which is used to generate the decision statistic(s) 507. For example, a first feature vector representing the inventory item runtime input 503 can be determined to be closest in distance to a feature vector labeled as "geographical region A, for date range Z and item P." Such embedding may have a dot product value of a consumer demand value A. Accordingly, the decision statistic 507 is that for the runtime input 503, there will likely be a consumer demand value of A based on the closeness in distance to the training feature vector.

Figure 6:
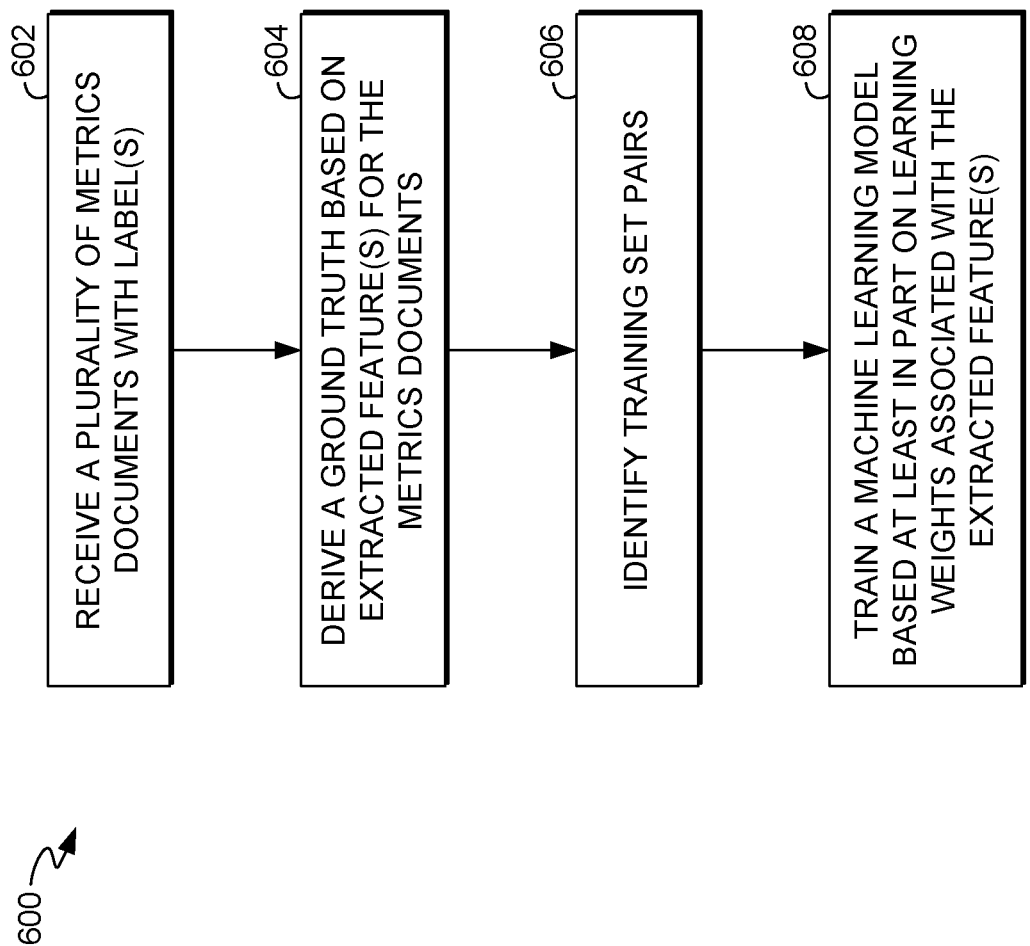
FIG. 6 is a flow diagram of an example process for training a machine learning model, according to some embodiments.

FIG. 6 is a flow diagram of an example process 600 for training a machine learning model, according to some embodiments. The process 600 (and/or any of the functionality described herein (e.g., process 700)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 600, 700, and/or any other functionality described herein. In some embodiments, the process 600 represents training the machine learning model(s) 505 of FIG. 5 via the training data inputs 515 of FIG. 5.

Per block 602, a plurality of metrics documents are received. For example, documents that include the statistics table 300 of FIG. 3 can be received for different geographical regions. Per block 604, a ground truth is derived based on one or more extracted features for the metrics documents. For example, referring back to FIG. 3, for geographic region A and Brand A color B sneakers, each of the view frequency, purchase frequency, skip frequency, watch frequency, and bid frequency counts (or aggregated value that represents the consumer demand) can be encoded into a feature vector and embedded in feature space.

Per block 606, training set pair are identified. Such training set pairs can be entirely different documents than the plurality of documents received at block 602, which were used to derive the ground truth. In an illustrative example of block 606, two training set pairs of the same type can be paired, such as two documents of metrics of geographical regions A and item A. In another example, two training set pairs of different types can be paired, such as two documents of metrics of different geographical regions A and B.

Per block 608, a machine learning model is trained based at least in part on learning weights associated with the extracted features. For example, various embodiments learn an embedding of the training set pairs in light of the ground truth. For instance, some embodiments can determine a distance between a ground truth feature vector representing a labeled metrics document and a feature vector representing one of the training set pairs. Based on the loss (e.g., the difference in distance between the ground truth and a training set pair) determined by a loss function (e.g., Mean Squared Error Loss (MSEL), cross-entropy loss), the loss function learns to reduce the error in prediction over multiple epochs or training session. For example, some embodiments train a neural network with the mean square error loss:

$$l = \frac{1}{n}\sum_{i}^{n} \|\grave{u}_i(t+1) - \grave{u}_i'(t+1)\|_2^2,$$

where ù$_i$'(t+1) is the ground truth. Some embodiments adopt the Adam optimizer for training, with a learning rate starting from 0.0001 along with a decay factor of 0.96 at each epoch.

Figure 7:
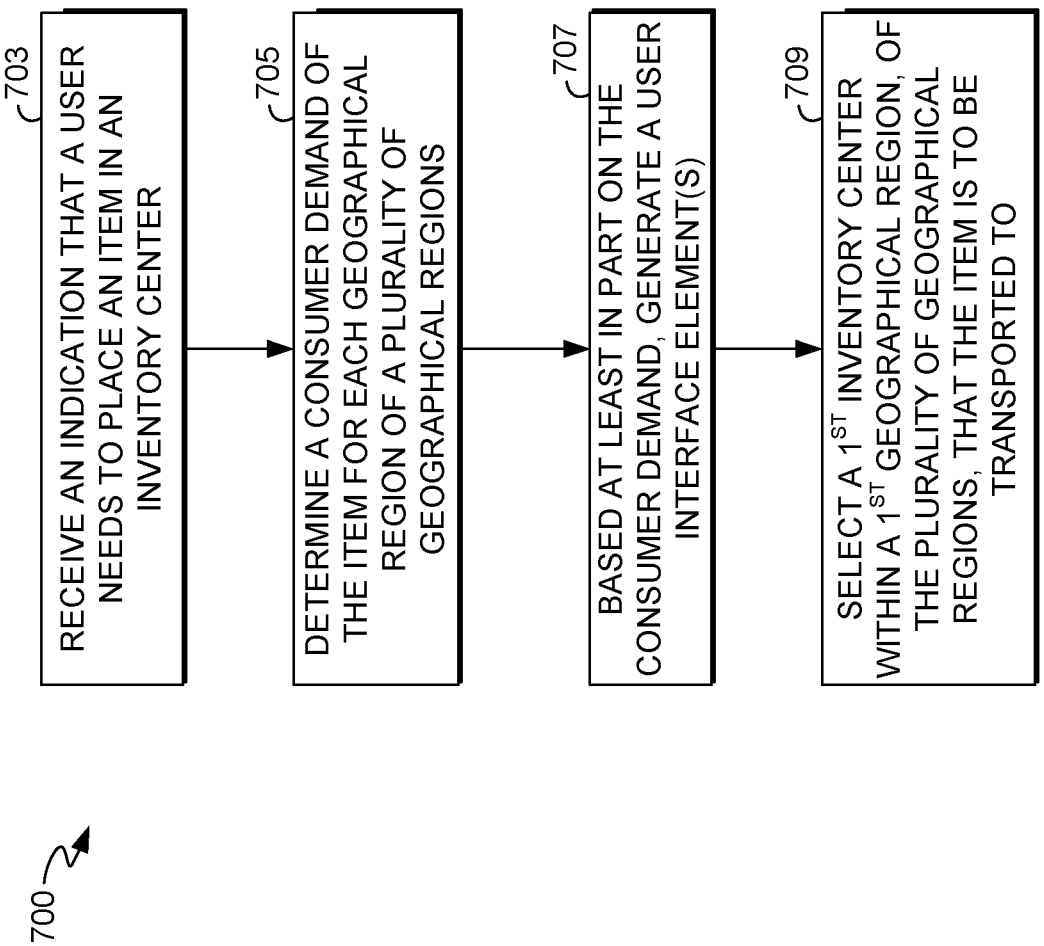
FIG. 7 is a flow diagram of an example process for selecting an inventory center to transport an item to, according to some embodiments.

FIG. 7 is a flow diagram of an example process 700 for selecting an inventory center to transport an item to, according to some embodiments. Per block 703 an indication (e.g., a flag or control signal) that a user needs to place an item in an inventory center is received. For example, referring back to FIG. 2, particular embodiments can receive the query 225 in response to receiving an indication that the user has selected the submit button 223. Receiving such query 225 can be an indication or request to place an item in an inventory center.

Per block 705, some embodiments determine a consumer demand (e.g., user activity data) of the item for each geographical region of a plurality of geographical regions (e.g., in response to the receiving of the indication at block 703). Each geographical region may include one or more inventory centers, as illustrated, for example in the bubble map 205 of FIG. 2. Examples of determining such consumer demand is described by the consumer demand module 104 of FIG. 1, and the statistics table 300 of FIG. 3. In some embodiments, the determining of the consumer demand is based at least in part on using one or more machine learning models as described, for example, in FIG. 5 and FIG. 6.

Per block 707, based at least in part on the consumer demand, some embodiments generate one or more user interface elements. In some embodiments, such one or more user interface elements at least partially indicate or represent the consumer demand at one or more geographical regions of the plurality of geographical regions. For instance, the one or more user interface elements may include a bubble data object of a bubble map, where a size of the bubble data object indicates or is directly proportional to the consumer demand for the item at a particular geographical region. Examples of this are described in FIG. 2. For instance, the largest bubble data object is 207, which is also the data object associated with the highest consumer demand (and/or cost). In some embodiments, the one or more user interface elements further indicate or represent the cost of getting the item to a given inventory center as described, for example, with respect to the cost module 106 of FIG. 1 and FIG. 2. Likewise, user interface elements, such as bubble data objects can indicate or be directly proportional to the cost, as described with respect to FIG. 2. In some embodiments, block 707 can alternatively or additionally include generating a notification that states, in natural language, which geographical area has the highest consumer demand for the item. Alternatively or additionally, block 707 can include presenting a list of ranked inventory centers as described, for example, with respect to the window pane 217 of FIG. 2.

Per block 709, some embodiments select a first inventory center within a first geographical region, of the plurality of geographical regions that the item is to be transported to. In some embodiments, such selection is based on receiving a user selection associated with the one or more user interface elements. This is described, for example, with respect to the pointer 208, the indicia 215, and the indicia 221 where the user can select corresponding UI elements in order to select the desired inventory center. In response to the user selection, embodiments can then select (e.g., flag) the same inventory center for storage or transportation of the item to. Alternatively, some embodiments can automatically select inventory centers without user input.

In some embodiments, block 709 is preceded by or includes generating a recommendation to store or transport the item to a first inventory center in a first geographical region based at least in part on the consumer demand. For example, the recommendation can be an explicit natural language notification that states that the first inventory center is in a geographical area that has the highest consumer demand and therefore the user should select the first inventory center for storage. In some embodiments, the recommendation is more implicit or indirect, such as providing a ranked list of inventory centers (e.g., the list 219 of FIG. 2).

In some embodiments block 709 is preceded by or includes ranking each inventory center in each geographical region as candidates to store or transport the item to based at least in part on the consumer demand (e.g., user activity data). And in response to the ranking, these embodiments generate a user interface element that indicates the ranking. Such functionality is described, for example, with respect to the window pane 217 of ranked fulfillment centers 219.

In some embodiments, a same user has multiple items that need to be placed in one or more inventor centers. This can lead to a situation where the same inventory center is selected for all of the items or the user's items are spread out amongst various inventory centers (e.g., depending on the consumer demand and/or cost for each item and geographical area). For example, some embodiments receive a second indication that the user needs to place a second item in an inventory center. In response to the receiving of the second indication, particular embodiments determine a consumer demand of the second item for each geographical region of the same plurality of geographical regions. Based at least in part on the consumer demand, some embodiments generate a second one or more user interface elements (e.g., a second bubble data object) that indicate the consumer demand of the second item at one or more geographical regions of the plurality of geographical regions. And based on a user selection associated with the second one or more user interface elements, some embodiments select a second inventory center within a second geographical region, of the plurality of geographical regions that the second item is to be transported to.

In some embodiments, there is various downstream functionality that occurs after inventory centers have been selected per block 709 in order to complete consumer transactions (e.g., as described with respect to the item listing query execution module 111 of FIG. 1). For example, subsequent to the selecting, some embodiments cause an actual transportation of the item (e.g., via a logistics vehicle) to the inventory center. And subsequent to the causing, some embodiments receive a user request of a second user for an item listing that indicates the same first item. The item listing can be included in an electronic marketplace and the first item can be for sale via an electronic marketplace. The second user, such as a buyer, can be in the very same geographical region that the selected inventory center is located in. In response to the receiving of the user request, some embodiments cause presentation of the item listing as a search result on a search results page for the user request. Various embodiments then receive a user selection of the search result at the search results page. And subsequent to the user selection, some embodiments cause transportation of the item from the first inventory center to a destination location associated with the second user and the first geographical region. In this way, delivery costs to the destination location can be mitigated for the buyer because the inventory center is close to the buyer. This cost mitigation is likely to occur much more often since the consumer demand is calculated for each geographical area and corresponding inventory centers are much more likely to be selected.

Figure 8:
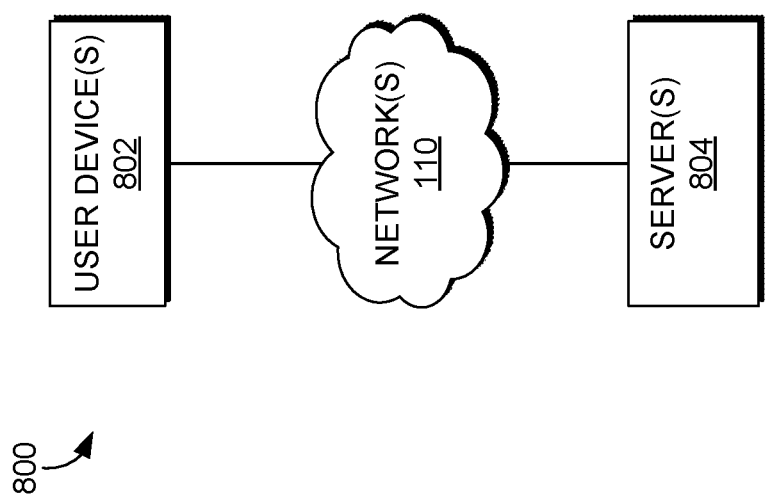
FIG. 8 is a block diagram of a computing environment in which aspects of the present disclosure are employed in, according to some embodiments.

FIG. 8 is a block diagram of a computing environment 800 in which aspects of the present disclosure are employed in, according to certain embodiments. Although the environment 800 illustrates specific components at a specific quantity, it is recognized that more or less components may be included in the computing environment 800. For example, in some embodiments, there are multiple user devices 802 and multiple servers 804 (e.g., electronic marketplace servers), such as nodes in a cloud or distributing computing environment. In some embodiments, some or each of the components of the system 100 of FIG. 1 are hosted in the one or more servers 804. Alternatively, in some embodiments, some or each of the components of the system 100 are hosted in the user device 802. In some embodiments, the user device(s) 802 and/or the server(s) 804 may be embodied in any physical hardware, such as the computing device 900 of FIG. 9.

The one or more user devices 802 are communicatively coupled to the server(s) 804 via the one or more networks 110. In practice, the connection may be any viable data transport network, such as, for example, a LAN or WAN. Network(s) 110 can be for example, a local area network (LAN), a wide area network (WAN) such as the Internet, or a combination of the two, and include wired, wireless, or fiber optic connections. In general, network(s) 110 can be any combination of connections and protocols that will support communications between the control server(s) 804 and the user devices 802.

In some embodiments, a user issues a query on the one or more user devices 802, after which the user device(s) 802 communicate, via the network(s) 110, to the one or more servers 804 and the one or more servers 804 executes the query (e.g., via one or more components of FIG. 1) and causes or provides for display information back to the user device(s) 802. For example, the user may issue the query 225 of FIG. 2 at the user device 802 to request placement of an item in an inventory center. Responsively, the one or more servers 804 execute the query, such as providing the bubble map 205 and/or the ranked list of fulfillment enters 219 of FIG. 2

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 9:
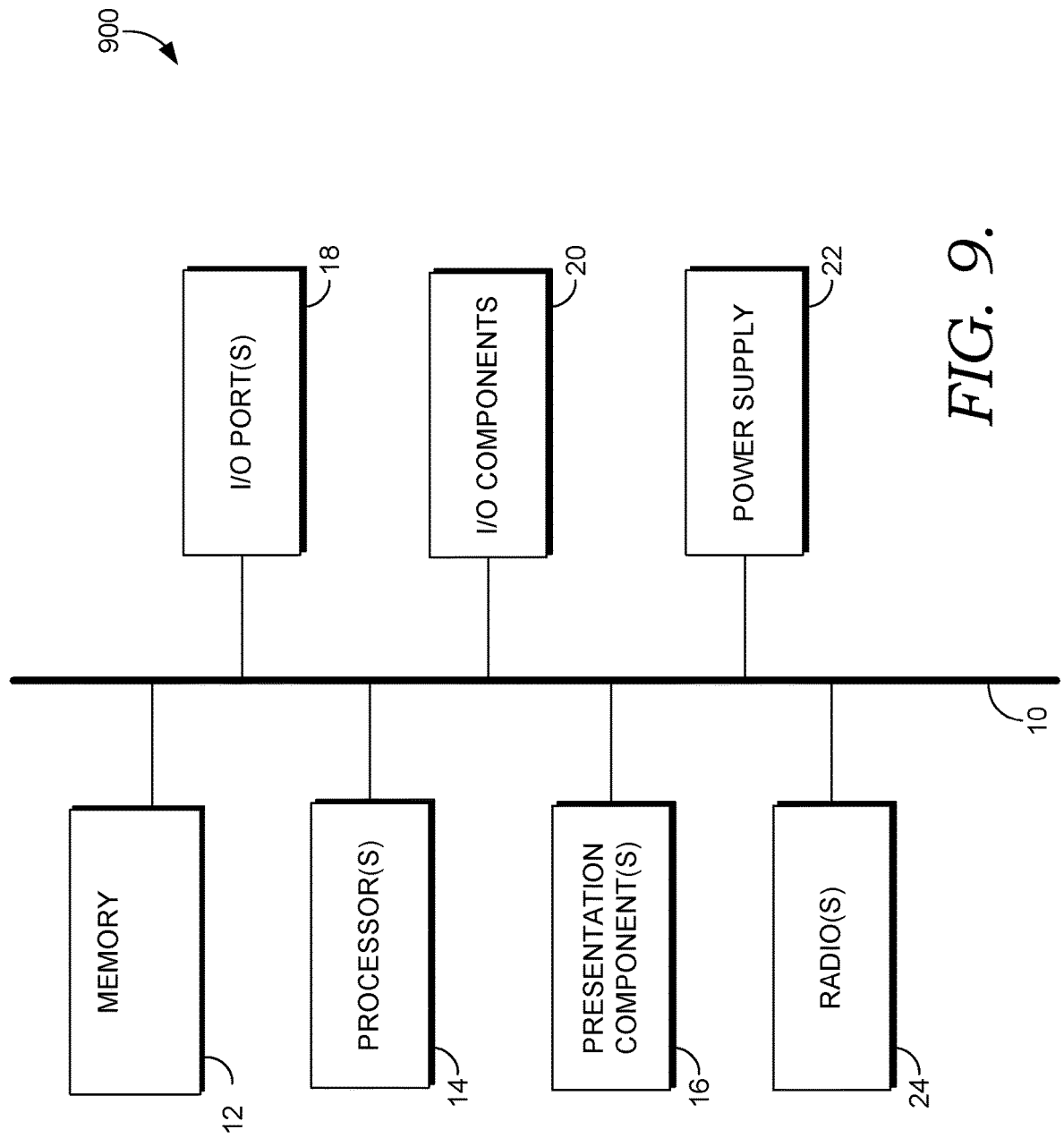
FIG. 9 is a block diagram of a computing device in which aspects of the present disclosure are implemented within, according to some embodiments.

With reference to FIG. 9, computing device 900 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

In some embodiments, the computing device 900 represents the physical embodiments of one or more systems and/or components described above. For example, the computing device 900 can represent: the one or more user devices 902, the server(s) 904 of FIG. 8. The computing device 900 can also perform some or each of the blocks in the process 600, 700 and/or any functionality described herein with respect to FIGS. 1-9. It is understood that the computing device 900 is not to be construed necessarily as a generic computer that performs generic functions. Rather, the computing device 900 in some embodiments is a particular machine or special-purpose computer. For example, in some embodiments, the computing device 900 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 14 that read data from various entities such as memory 12 or I/O components 20. Presentation component(s) 16 present data indications to a user or other device. Exemplary presentation components 16 include a display device, speaker, printing component, vibrating component, etc.

I/O ports 18 allow computing device 900 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computer-implemented method comprising:
   receiving, at a user interface of a first page of an electronic marketplace application, user input that specifies an item, the item being a candidate for purchase at the electronic marketplace application;
   in response to the receiving of the user input, encoding the user input as a flag or data signal indicative of a user request to place the item in a fulfillment center, the fulfillment center is indicative of a physical location from which one or more logistics providers fulfill buyer orders from the electronic marketplace application;
   in response to the encoding of the user input as a flag or data signal, accessing, from computer memory, a data structure that indicates a quantity of computer user activity for the item and for each geographical region of a plurality of geographical regions, wherein the quantity of computer user activity being indicative of a consumer demand of the item for each geographical region, each geographical region including one or more fulfillment centers;
   in response to the accessing, from computer memory, of the data structure, causing generation, at the first page, of one or more user interface elements that superimpose data objects that indicate the computer user activity over a map, wherein the superimposing is indicated at the plurality of geographical regions that include one or more fulfillment centers, wherein the first page also includes one or more other user interface elements that indicate each fulfilment center, of the one or more fulfillment centers, and a respective geographical region that the fulfilment center is in; and
   based on a user selection associated with the one or more user interface elements or the one or more other user interface elements, selecting a first fulfillment center within a first geographical region, of the plurality of geographical regions, that the item is to be transported to.

2. The method of claim 1, further comprising:
   ranking each fulfillment center for each geographical region, of the plurality of geographical regions, based at least in part on the quantity of computer user activity of the item at each geographical region, wherein the one or more user interface elements indicates the ranking; and
   based on the ranking, recommending the first fulfillment center to transport the item to.

3. The method of claim 1, wherein the causing generation of the one or more user interface elements is further based on a cost of placing the item at each fulfillment center, wherein the one or more user interface elements further indicate the cost.

4. The method of claim 1, further comprising:
   receiving an indication that the user needs to place a second item in a fulfillment center;

in response to the receiving of the second indication, determining a consumer demand of the second item for each geographical region of the plurality of geographical regions;

based at least in part on the consumer demand, generating a second one or more user interface elements that indicate the consumer demand of the second item at one or more geographical regions of the plurality of geographical regions; and based on a user selection associated with the second one or more user interface elements, selecting a second fulfillment center within a second geographical region, of the plurality of geographical regions, that the second item is to be transported to.

5. The method of claim 1, wherein the consumer demand is determined in part on using one or more machine learning models.

6. The method of claim 1, wherein the one or more user interface elements includes a bubble data object of a bubble map, and wherein a size of the bubble data object indicates the consumer demand for the item at a particular geographical region.

7. The method of claim 1, further comprising:
subsequent to the selecting, causing an actual transportation of the item to the first fulfillment center; and
subsequent to the causing, receiving a user request for an item listing that describes the item, the item listing being included in the electronic marketplace application, the item being for sale via the electronic marketplace application, a second user associated with the user request being located at the first geographical region.

8. The method of claim 7, further comprising
in response to the receiving of the user request, causing presentation of the item listing as a search result on a search results page for the user request;
receiving a user selection of the search result at the search results page; and
subsequent to the user selection, causing transportation of the item from the first fulfillment center to a destination location associated with the second user and the first geographical region.

9. A system comprising:
at least one processor; and
at least one computer readable data storage device storing instructions that, when executed by the at least one processor, cause the system to:
based on user input at a user interface of a first page of an electronic marketplace application, encode the user input as a flag or data signal indicative of a user request to place an item in a fulfillment center, the fulfillment center is indicative of a physical location from which one or more logistics providers fulfill buyer orders from the electronic marketplace application, the item being a candidate for purchase at the electronic marketplace application;
in response to the encoding of the user input as a flag or data signal, accessing one or more data structures that indicate a quantity of computer user activity for the item and for each geographical region of a plurality of geographical regions, wherein the quantity of computer user activity being indicative of a consumer demand of the item for each geographical region, each geographical region including one or more fulfillment centers; and
based at least in part on the quantity of computer user activity for the item and for each geographical region, generate a recommendation, for display at the first page, to store the item to a first fulfillment center in a first geographical region, wherein the first page further includes user interface elements that superimpose data objects comprising an indication of the computer user activity over a map, wherein the superimposing is indicated at each geographical region of the plurality of geographical regions, and each fulfilment center, of the one or more fulfillment centers, that each geographical region is associated with.

10. The system of claim 9, wherein the recommendation is based at least in part on ranking each fulfillment center for each geographical region, of the plurality of geographical regions, based at least in part on the quantity of computer user activity for each geographical region.

11. The system of claim 9, wherein the recommendation is further based on a cost of placing the item at each fulfillment center.

12. The system of claim 9, wherein the system is further caused to generate one or more user interface elements that indicate the recommendation.

13. The system of claim 9, wherein the system is further caused to determine a consumer demand based at least in part on using one or more machine learning models or statistical models.

14. The system of claim 9, wherein the system is further caused to:
subsequent to the recommendation, cause an actual transportation of the item to the first fulfillment center; and
subsequent to the causing, receiving a user request for an item listing that indicates the first item, the item listing being included in the electronic marketplace application, the item being for sale via the electronic marketplace application, a second user associated with the user request being located at the first geographical region.

15. The system of claim 14, wherein the system is further caused to:
in response to the receiving of the user request, cause presentation of the item listing as a search result on a search results page for the user request;
receive a user selection of the search result at the search results page; and
subsequent to the user selection, cause transportation of the item from the first fulfillment center to a destination location associated with the second user and the first geographical region.

16. One or more computer storage media having computer-executable instructions embodied thereon that, when executed, by one or more processors, cause the one or more processors to:
based on user input at a user interface of an electronic marketplace application, encode the user input as a flag or data signal indicative of a user request to place an item in a fulfillment center, the fulfillment center is indicative of a physical location from which one or more logistics providers fulfill buyer orders from the electronic marketplace application, the item being a candidate for purchase at the electronic marketplace application;
in response to the encoding of the user input as a flag or data signal, access, at the one or more computer storage media and for the item, one or more data structures that indicate a quantity of computer user activity at each geographical region, of a plurality of geographical regions, each geographical region including one or more fulfillment centers;

based at least in part on the quantity of the computer user activity data, rank each fulfillment center in each geographical region as candidates to store or transport the item to; and in response to the ranking, generating, at a first page of the user interface, user interface elements that superimpose data objects that indicate the computer user activity over a map, wherein the superimposing is indicated at each fulfillment center in each geographical region and the ranking.

17. The computer storage media of claim 16, wherein the ranking is further based on a cost.

18. The computer storage media of claim 16, wherein the ranking is based at least in part on using one or more machine learning models.

19. The computer storage media of claim 16, wherein the interface element includes a bubble data object of a bubble map, and wherein a size of the bubble data object indicates a consumer demand and a cost for the item at a particular geographical region.

20. The computer storage media of claim 16, the one or more processors are further caused to:

subsequent to the generating a user interface element, cause an actual transportation of the item to the first fulfillment center; and subsequent to the causing, receive a user request for an item listing that indicates the item, the item listing being included in the electronic marketplace application, the item being for sale via the electronic marketplace application, a second user associated with the user request being located at the first geographical region.

* * * * *